INVENTOR.
Charles L. Fry
Edwin L. Fry

Sept. 16, 1969     C. L. FRY ET AL     3,467,238
TRANSFER TERMINAL FOR CONVEYOR BELT Filed Aug. 1, 1967     2 Sheets-Sheet 2

INVENTOR.
Charles L. Fry
Edwin L. Fry
BY Van Valkenburgh & Lowe

ATTORNEYS

United States Patent Office 3,467,238
Patented Sept. 16, 1969

3,467,238
TRANSFER TERMINAL FOR CONVEYOR BELT
Charles L. Fry and Edwin L. Fry, Canon City, Colo., assignors, by mesne assignments, to Portec, Inc., a corporation of Delaware
Filed Aug. 1, 1967, Ser. No. 657,586
Int. Cl. B65g 37/00
U.S. Cl. 198—88     8 Claims

ABSTRACT OF THE DISCLOSURE

A transfer terminal for a belt conveyor which is a lateral, tributary feed to a primary belt conveyor. The terminal includes two short belt sections which are extended in tandem from the end of the tributary conveyor. The leading section is a short, straight reach having its leading end adjacent to the trailing end of the tributary conveyor. This leading section is within the support frame of the transfer terminal. The second, trailing section, is a conveyor belt turn cantilevered outwardly from the support frame to extend over the belt of the primary conveyor. This turn is mounted on parallelogram arms which are actuated to lift the turn and, at the same time, to maintain it in a substantially horizontal position. At the lower operative position, the belt of the turn is aligned with the belt of the leading section and lies upon the surface of the primary belt conveyor. At its uppermost position, the turn is lifted from the primary conveyor a distance sufficient to permit clear operation of the primary conveyor.

In belt conveyors used for baggage and similar items, protective sidewalls are required. To avoid interference by these walls during operation of the transfer terminal, a portion of the sidewall on the primary conveyor, which lies immediately underneath the transfer terminal turn, is formed as a vertically shiftable gate which can drop out of the way whenever the conveyor belt turn is lowered upon the primary conveyor to its operative position.

Suitable electrical safety switches and programming controls can be used to alternatively operate a number of transfer terminals which discharge onto the same primary belt in a manner such as to prevent interference of the movement of materials from the tributary belts and onto the primary belt.

---

This invention relates to belt conveyor apparatus, and more particularly to apparatus for transferring the flow of items from one conveyor to another.

A primary object of the invention is to provide in a belt conveyor system, which includes a primary conveyor and a lateral or tributary conveyor feeding into the primary conveyor, a novel and improved transfer apparatus at the terminus of the tributary conveyor which is adapted to provide smooth, easy movement of material from the tributary conveyor and onto the primary conveyor. As such, the invention will be hereinafter referred to as a transfer terminal for a belt conveyor.

The invention has special application to baggage conveyor systems, such as used in airlines, where articles of baggage are commonly received and tagged, as at a ticket counter, and subsequently, belt conveyed to a loading station. At large airline terminals, it is necessary to provide an array of baggage receiving stations, and a belt conveyor will extend from each baggage receiving station to the point of destination. However, such a system of individual conveyors can become quite complex.

To simplify such a system, it has been suggested that a series of short tributary conveyors be used. These tributary conveyors would then feed to a common primary conveyor which extends to the loading station. Heretofore, such systems, used for other purposes, simply provide for a tributary belt conveyor which spills upon a primary belt conveyor, permitting the material to drop from one belt to the other. Such an arrangement cannot be used for the movement of baggage because it is important to protect the articles of baggage from abuse. Baggage conveyor belts move at moderate rates, do not have steep inclines and are provided with protective sidewalls, and an arrangement where it would drop from one belt to the other is not desired. Moreover, such a suggested arrangement would at first appear to be impractical because of the interference of baggage moving on the primary conveyor with that moving from the tributary conveyor and onto the primary conveyor.

With such problems in view, the present invention was conceived and developed and comprises, in essence, a transfer terminal to interconnect the end of a tributary conveyor with a primary belt conveyor. The terminal includes a conveyor belt turn which overlies the primary conveyor and is vertically actuated to rest upon the belt of the primary conveyor when it is in use, and to be lifted thereabove and out of the way when not in use. The turn is curved through an arc selected to effect the necessary change in the direction of movement of material from the tributary conveyor to the primary conveyor, with the end of the turn being oriented in the same direction as the primary conveyor, as will be hereinafter further described.

It follows that another object of the invention is to provide a novel and improved transfer terminal for shifting material from a tributary belt conveyor to a primary belt conveyor which operatively interconnects the conveyors when in use, but which may be raised upwardly and out of the way when not in use.

Another object of the invention is to provide in a transfer terminal for belt conveyors, a simplified and improved arrangement for changing the direction of movement of items, such as baggage, to shift them about a smooth, curved path to prevent them from being suddenly disrupted and thrown against the sidewalls of the conveyor structures, and possibly damaged.

A further object of the invention is to provide novel and improved transfer terminals for interconnecting a plurality of tributary belt conveyors to a common primary belt conveyor, which are easily adapted to operate by programming systems, individually, or in selected sequences, and which may be easily controlled by safety arrangements to render the operations substantially foolproof.

Further objects of the invention are to provide a transfer terminal for connecting a lateral, tributary conveyor to a primary conveyor which is simple, inexpensive, reliable, rugged and durable.

With the foregoing and other objects in view, as will hereinafter further appear, our invention comprises certain constructions, combinations and arrangements of parts and elements as hereinafter described, defined in the appended claims, and illustrated, in preferred embodiment, in the accompanying drawing in which:

Figure 1:
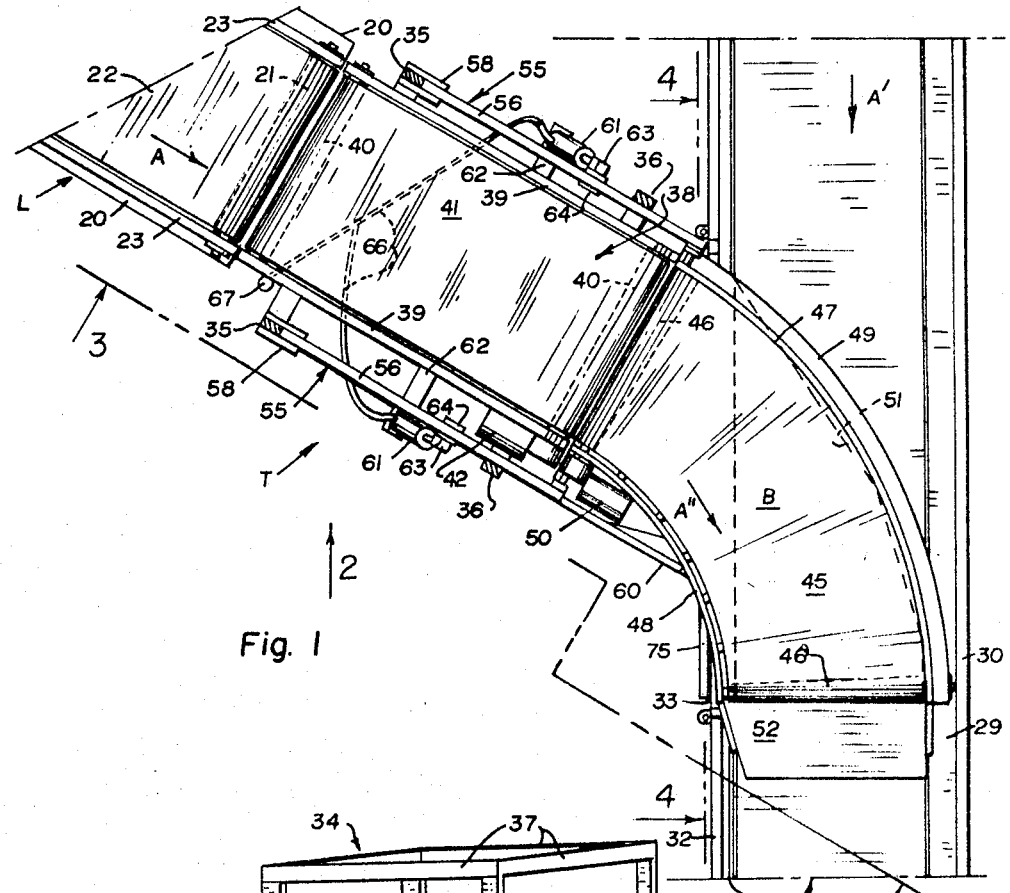
FIGURE 1 is a plan view of the transfer terminal installed at the junction of a tributary conveyor and a primary conveyor, the view showing only those portions of the primary and tributary conveyors which are adjacent to the transfer terminal.
Figure 2:
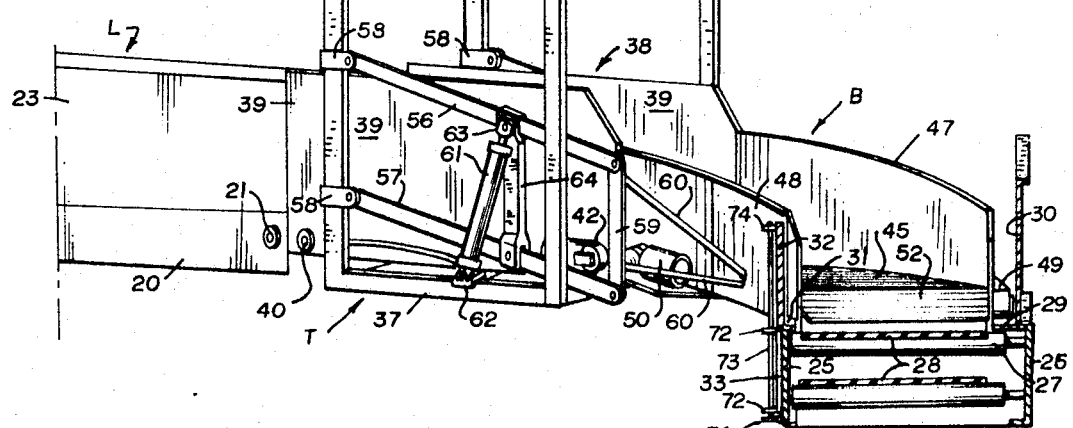
FIGURE 2 is a side elevational view of the structure as from the indicated arrow 2 at FIG. 1, but with the view being slightly in perspective to better show the conveyor belt turn of the transfer terminal when it is lowered upon the primary conveyor to an operative position.
Figure 3:
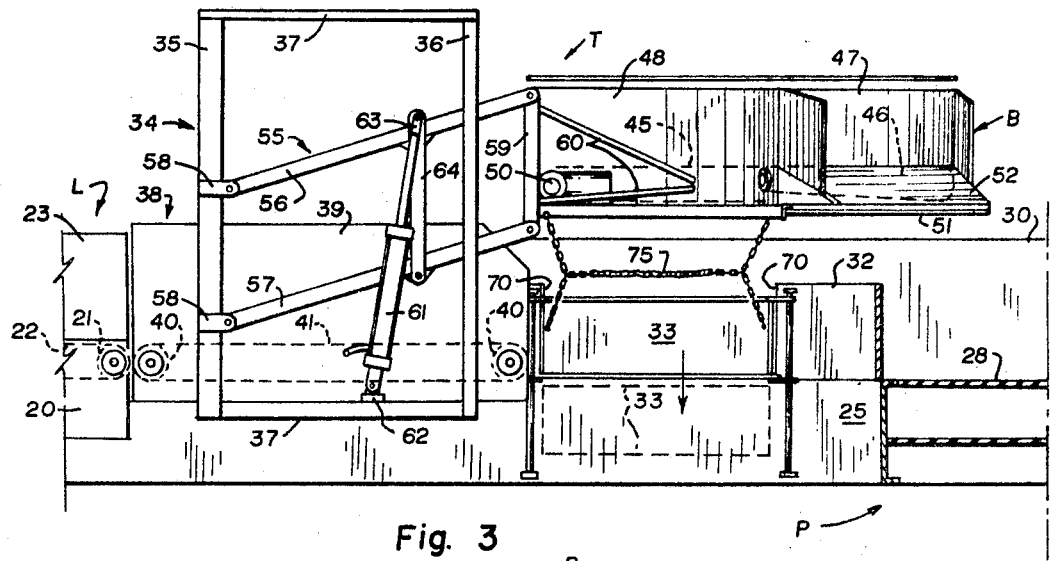
FIGURE 3 is a side elevational view of the structure as from the indicated line 3—3 at FIG. 1, but with the transfer terminal being raised above the primary belt conveyor to be clear of this conveyor.

Referring more particularly to the drawing, FIG. 1 illustrates a basic arrangement of belt conveyors which incorporate the improved transfer terminal T with a primary conveyor P and a tributary conveyor L. The tributary conveyor L approaches the primary conveyor from a lateral, angled direction and terminates adjacent to the primary conveyor. The transfer terminal T forms a continuation and extension of this lateral tributary conveyor, with its trailing portion being a conveyor belt turn B, as hereinafter described. This turn B is cantilevered from the frame of the transfer terminal T to overlie the primary conveyor P and is curved to be in alignment with the primary conveyor to permit a smooth turning movement of items from the tributary conveyor L to the primary conveyor P. In the embodiment illustrated, the tributary conveyor L approaches the primary conveyor at an angle of 60 degrees which defines a change in direction of movement of items from the tributary conveyor to the primary conveyor. Correspondingly, the turn B extends through an arc of 60 degrees. It is manifest, that the angle of approach from the tributary belt conveyor to the primary conveyor may be varied considerably by changing the arcuate extent of the trailing turn B. Also, the alignment of the tributary conveyor L itself may be changed as it approaches the transfer terminal T. However, such an expedient is not herein illustrated, since it would not form a part of the invention.

The tributary belt conveyor L is of any suitable conventional construction, and includes a pair of opposing, longitudinally-disposed frame members 20 having a spaced array of transverse rollers 21 to carry and support a longitudinally disposed belt web 22. This conveyor belt is provided with sidewalls 23 to laterally confine items moving on the belt. The unit also includes apparatus to drive the belt web, as in the direction of the indicated arrow A at FIG. 1.

The primary conveyor P is also essentially conventional in construction, but with the frame and sidewall components being modified to permit the cantilevered turn B of the transfer terminal T to be placed upon the belt of the conveyor, as will be hereafter further described. The frame of the primary conveyor P includes an inward member 25 at the side of the transfer terminal, and an outward member 26 at the opposite side thereof which is parallel to the inward member. An array of transverse rollers 27, disposed between these frame members, support a belt web 28 which is adapted to move in the direction of the indicated arrow A' at FIG. 1. The upper end of the outward frame member 26 is turned inwardly at the level of the web to form a shelf 29 extending closely to the web, and an outer sidewall 30 upstands from this shelf 29. The shelf provides a comparatively wide space between the edge of the web 28 and the sidewall 30 to provide clearance for the end of the conveyor turn B. A comparable shelf 31 of the inward frame member 25 is considerably narrowed, and the inward sidewall 32 overhangs the outer face of this inward frame member 25 to permit a vertically movable gate 33 to be flush mounted in a gap in this sidewall 32 which is located underneath the turn B, as will be hereinafter described.

The transfer terminal T is carried in a rectangular box-like frame 34 which is mounted in any suitable manner to a floor, wall or ceiling structure beyond the end of the tributary conveyor in alignment therewith, and at the side of the primary conveyor. The frame 34 includes a pair of leading uprights 35 near the head of the terminal, that is, adjacent to the end of the tributary conveyor, and a pair of trailing uprights 36 near the side of the primary conveyor P. These upright members are secured together in any suitable manner, as by longitudinal and transverse headers 37 at the top and bottom of the upright posts. A short, straight conveyor approach section 38 extends through this framework, with its leading end adjacent to, leveled and aligned with the trailing end of the tributary conveyor L. The trailing end of the section 38 is adjacent to the side of the primary conveyor P and at the leading end of the turn B. This approach section 38 is formed between parallel frame members 39 which are supported upon transverse bottom headers 37. Rollers 40 are mounted transversely between these frame members 39 to support a belt web 41. The belt 41 of this short approach section is powered by a suitable motorized drive 42 to move the belt in unison with the movement of the tributary belt conveyor L to permit items to move from the tributary belt 22 and onto the approach section without any significant interruption.

The turn B, which overlies the primary belt and forms the trailing end of the transfer terminal, is of a suitable conventional type such as described in the Patent No. 3,044,603 issued to Charles L. Fry on July 17, 1962. This turn B provides for a curved belt 45 mounted on conical rollers 46 sized to permit the belt to follow a continuous arcuate path. The size of the turn is such as to permit the leading end of the belt 45 to be adjacent to the trailing end of the belt 41 in the approach section 38, and to extend thence over the side of the primary conveyor and over the belt 28, with the trailing end of the turn belt 45 being in alignment with the conveyor belt 28. The framework of this turn B includes a curved outer sidewall 47 and a curved inner sidewall 48, each of which upstands from its side of the curved belt to confine items upon this belt. The frame also includes an arcuate, outwardly-extended ledge 49 at the outer sidewall, at the belt level, to contain belt restraining elements best described in the aforementioned patent. The turn B also includes a motor drive 50 mounted alongside the inner wall 48 and connected with a roller 46, for driving the belt at substantially the same speed as the other belts are driven, as in the direction of the indicated arrow A" at FIG. 1. The framework of the turn is especially designed to have a flat underside, with a minimum of vertical space for holding the return reach of the belt 45, so that the turn can lie flatly upon, or closely adjacent to, the primary conveyor belt when in operative position, and with the level of the top surface of the turn belt 45 being at a minimum distance above the surface of the primary conveyor belt 28. The underside of that portion of the turn overlying the belt 28, is shielded from the belt by a flat, smooth plate 51, or like framework, which presents a low-friction surface to the moving belt 28, underneath the turn, when the turn is lying closely adjacent to the belt. To complete the unit, a ramp 52 is extended from the trailing end of the belt 45, and slopes downwardly and onto the primary belt 28 so that the drop of items moving from the turn B and onto the primary conveyor P will be with a minimum of disruption to their movement.

The turn B is adapted to be elevated above the primary conveyor P when it is not in use, to permit the primary conveyor to carry items supplied from other sources, such as a second tributary conveyor. Accordingly, the cantilevered turn B is mounted upon a hoist, and preferably upon a parallelogram hoist 55, as illustrated, to hold the turn in a horizontal position at all elevations. This parallelogram hoist 55 is formed as two parallelogram members, one at each side of the framework 34. Each member 55 includes an upper arm 56 and a lower arm 57, and each arm is pivotally connected to the leading upright post 35, at its side of the framework, by a clevis clamp 58 to extend outwardly from the post and towards the trailing end of the approach section, to swing in a vertical arc from a generally horizontal position. The outer end of each upper arm 56 and the outer end of its corresponding lower arm 57 are pivotally connected together by a vertical link 59. This link has a length the same as the clevis spacing, to complete the parallelogram.

The two parallelogram members 55 extend substantially parallel with the approach section 38, and slightly beyond the trailing edge thereof, for connection with the leading end of the turn B. The turn is secured to the vertical links 59 by support struts 60 and by other connectors, not specifically shown, to cantilever therefrom. It follows that by swinging the parallelogram members 55 in vertical arcs, in unison, the cantilevered turn B is raised and lowered.

The raising and lowering movements of the parallelogram hoist members 55 are accomplished by any suitable mechanism, such as the pneumatic cylinder 61 illustrated. A transverse bar 62 extends across the lower longitudinal headers 37, and outwardly from each side of the frame 34, to provide abutment surfaces for holding the base of the cylinders. Each cylinder extends upwardly therefrom, and preferably to the upper arm, where the head 63 of its piston rod is pivotally connected to an intermediately positioned vertical link 64 connected to the arms. This link 64 is provided to minimize stress problems in the arms, since the up push by the cylinder piston rod to lift the turn B will then be against both the upper and lower arms 56 and 57. The movement of the pistons, in unison, is accomplished in any suitable manner, as by a compressed air supply line 66, which is branched to operate both pistons simultaneously. Such a line, shown at FIG. 1, is controlled by a conventional valve 67 of the type sometimes referred to as a three-way valve, which directs a flow of air into the pistons to extend them to raise the turn B, and which permits air to bleed from the pistons to permit the turn to be lowered by its own weight.

Figure 4:
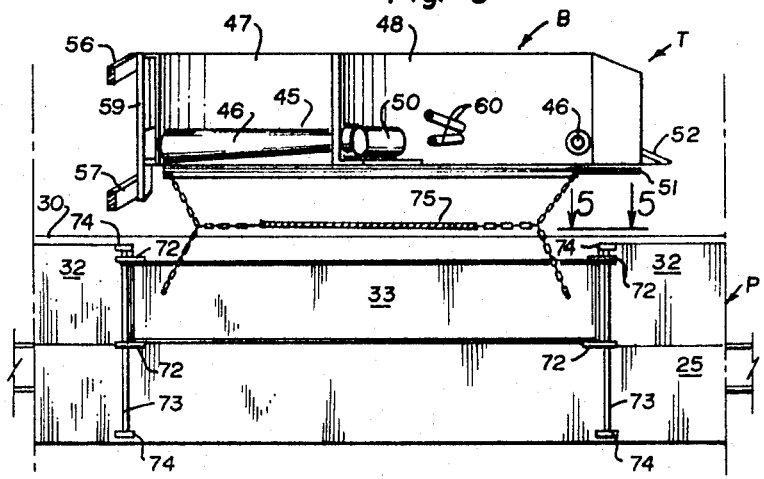
FIGURE 4 is a fragmentary sectional elevational view, as taken from the indicated line 4—4 at FIG. 1, but with the transfer terminal being at a raised position.
Figure 5:
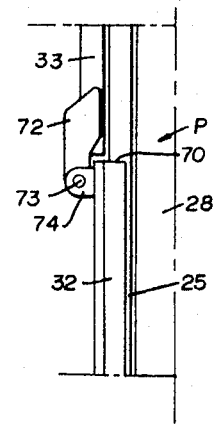
FIGURE 5 is a fragmentary detailed view as taken from the indicated line 5—5 at FIG. 4.

To lower the conveyor belt turn upon the surface of the primary conveyor belt 28, it is necessary to provide a clearance gap 70 at its inner sidewall 32 immediately beneath the turn B. This gap 70 is closed by the gate 33 whenever the turn is raised above the primary conveyor. As heretofore described, the inner sidewall 32 preferably overhangs the inward frame member 25 below it, so that the gate may be mounted in the opening 70 with its inner surface flush with the inner surface sidewall 32 to avoid any jutting corner which might catch the corner of an item moving along the primary conveyor. This gate 32 is preferably a simple, channel-shaped member having a flat inward face and outwardly turned flanges 71 at its top and bottom to enhance its structural rigidity. A lug 72 outstands laterally from each corner of both the upper and lower flanges 71. Each lug 72 is provided with a hole through it to mount the gate upon a pair of vertical rods 73. These vertical rods 73 outstand from the sidewall and frame wall at each side of the gap 70. Each rod is supported by ears 74 outstanding from the top of the sidewall 32 and the bottom of the frame member 25, as in the manner illustrated at FIGS. 4 and 5. This simple arrangement permits the gate to drop out of the gap 70 by gravity or by the weight of the turn upon it, and it is conveniently held by a loose chain connection 75, secured to the conveyor belt turn B thereabove, so that whenever the conveyor belt turn moves upwardly, the gate is lifted, and whenever it moves downwardly, the gate drops out of the way.

Figure 6:
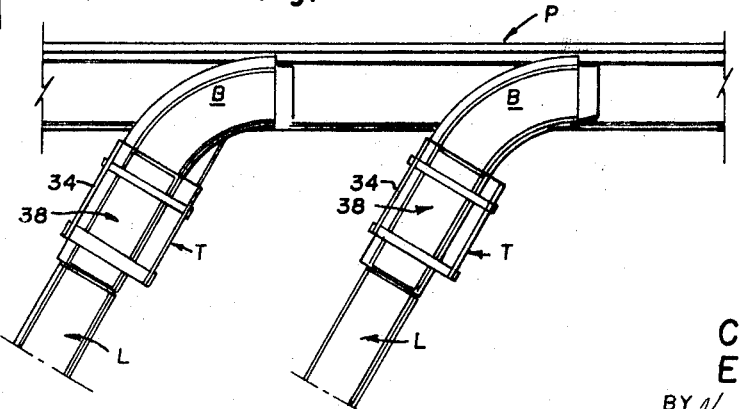
FIGURE 6 is a plan view, similar to FIG. 1, but on a reduced scale, and illustrating the use of more than one tributary belt conveyor on a primary belt conveyor.

In the apparatus thus far described, it is desirable to install suitable control and safety devices, preferably electrical switches. Such switches, not shown, may be arranged in any conventional manner. One switch arrangement will operate the valve 67 to raise and lower the turn to permit the flow of items from the tributary conveyor to the primary conveyor with the turn lowered, and permit a flow of items on the primary conveyor only when the turn is raised. In conjunction with such a switch, there must be interlocking circuit controls in the remainder of the system which will not permit items to be deposited upon the primary conveyor upline from the transfer terminal at the same time material is moving from the tributary conveyor to the primary conveyor. Also, an interlock control must be provided to prevent movement of items to the end of the tributary conveyor when the turn B is raised and items are moving along the primary conveyor. Where a plurality of tributary conveyors feed into a single primary conveyor, as in the manner indicated at FIG. 6, the interlock control system will become more complex to prevent the gates from acting together in unison.

We have now described our invention in considerable detail. However, it is obvious that others skilled in the art can build and devise alternate and equivalent constructions which are nevertheless within the spirit and scope of our invention.

We claim:

1. In combination with a primary conveyor and a tributary conveyor alongside and laterally of the primary conveyor, directed towards an intermediate portion of the primary conveyor and terminating adjacent to the primary conveyor, a transfer terminal at the terminus of the tributary conveyor adapted to continue the movement of items from the tributary conveyor and onto the primary conveyor, said transfer terminal including:
    (a) a conveyor belt turn operatively positioned with its leading end aligned with the belt of the tributary conveyor to receive items from the tributary conveyor and its trailing end overlying and aligned with the belt of the primary conveyor to deposit items onto the primary conveyor, the arc of the turn corresponding substantially to the change in direction of movement from the tributary conveyor to the primary conveyor; and
    (b) means for vertically moving said conveyor turn from, or to, the aforesaid operative position to, or from, a retracted position in which the trailing portion of the turn is spaced from the primary conveyor a distance sufficient to permit items on the primary conveyor to move therepast without interference by said turn.

2. In the combination defined in claim 1, wherein said articulated framework is adapted to lift said turn upwardly to the aforesaid retracted position and includes a parallelogram linkage adapted to hold the turn in substantially parallel planes, both when said turn overlies the primary conveyor at said operative position and when said turn is raised above the primary conveyor to the said retracted position.

3. In the combination defined in claim 1, wherein: said primary conveyor includes an upstanding wall at each side of its belt and a gap in the wall at the position of said conveyor belt turn, said turn being positioned in the gap when in said operative position and lifted above the gap when in said retracted position; and
    gate means for closing the gap when said turn is lifted to said retracted position.

4. In the combination defined in claim 3, wherein: said gate means moves upwardly to close said gap; and means connected between said turn and said gate means, for moving said gate means to close said gap in response to the lifting of said turn.

5. In the combination defined in claim 1, wherein said transfer terminal includes a short approach conveyor belt section extending from the terminus of the tributary conveyor to the leading end of said conveyor turn when said turn is positioned at the aforesaid operative position, said approach conveyor section being independently controllable to stop articles moved by said tributary conveyor when said turn is lifted.

6. In the combination defined in claim 1, including: a second tributary conveyor disposed beyond the first tributary conveyor in the direction of movement of said primary conveyor;

a second transfer terminal having a conveyor turn normally operatively positioned with its leading end aligned with said second tributary conveyor and its trailing end overlying and aligned with the primary conveyor; and means for vertically moving said second conveyor turn to a retracted position in which the trailing portion of said second turn is spaced from said primary conveyor a distance sufficient to permit items on the primary conveyor, received from said first tributary conveyor, to move without interference past the position of said second tributary conveyor.

7. In the combination defined in claim 1, wherein said conveyor belt turn is provided with a plate mounted on the underside of its trailing portion, said plate being smooth to provide a low friction surface between the under reach of the belt of said conveyor turn and the upper reach of the belt of said primary conveyor.

8. In the combination defined in claim 1, including a ramp at the trailing end of the turn to facilitate smooth deposition of items from the turn and onto the primary belt.

References Cited
UNITED STATES PATENTS

| | | | |
|---|---|---|---|
| 910,986 | 1/1909 | Blaisdell | 198—88 |
| 2,814,377 | 11/1957 | Jirak | 198—99 |
| 2,718,960 | 9/1955 | Standal | 198—45 |
| 3,334,725 | 8/1967 | Wardlaw | 198—79 |
| 3,342,159 | 9/1967 | Jones | 198—45 |

RICHARD E. AEGERTER, Primary Examiner

U.S. Cl. X.R.

198—102